H. P. BALL.
ELECTRIC HEATER FOR SEALING WAX AND THE LIKE.
APPLICATION FILED MAY 10, 1911.
1,064,042.
Patented June 10, 1913.
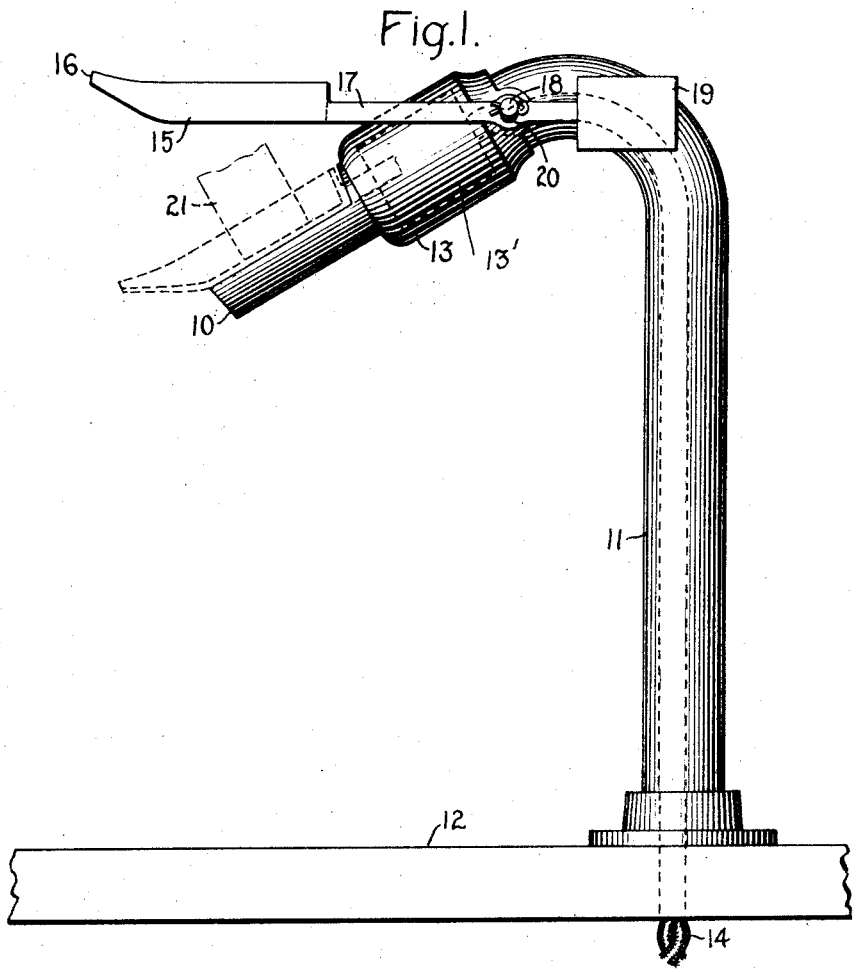
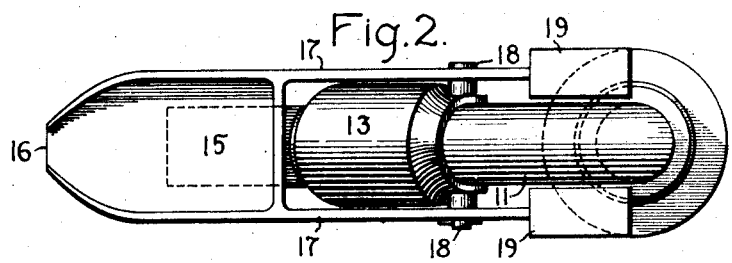
Witnesses:
Irving E. Sturs.
J. Ellis Glen.
Inventor
Henry P. Ball,
by Albert G. Davis
His Attorney.

UNITED STATES PATENT OFFICE.

HENRY PRICE BALL, OF PITTSFIELD, MASSACHUSETTS, ASSIGNOR TO GENERAL ELECTRIC COMPANY, A CORPORATION OF NEW YORK.

ELECTRIC HEATER FOR SEALING-WAX AND THE LIKE.

1,064,042.    Specification of Letters Patent.    Patented June 10, 1913.

Application filed May 16, 1911. Serial No. 626,243.

*To all whom it may concern:*

Be it known that I, HENRY P. BALL, a citizen of the United States, residing at Pittsfield, in the county of Berkshire, State of Massachusetts, have invented certain new and useful Improvements in Electric Heaters for Sealing-Wax and the Like, of which the following is a specification.

This invention relates to devices for heating material such as sealing wax and the like, and has for its object the provision of a device of this character which will be simple in construction and at the same time reliable and efficient in operation.

One of the objects of my invention is to provide a heater for sealing wax or the like in which the wax is used as fast as it is melted so that there will be no repeated reheating of the wax which would cause it to change its nature by driving out its volatilizing properties and leaving a gummy residue which is very difficult to melt.

In carrying out my invention I provide a heater of this character in which the heating element is entirely separate from the stick of wax to be melted, the arrangement being such that the wax to be melted is moved into contact with the heating element and then moved out of contact when a sufficient quantity has been melted.

In one embodiment of my invention I provide a melting pan for the wax which is normally out of contact with the heating element but which is moved into contact therewith when the wax is to be heated. The arrangement is such that the wax flows out of the pan while it is being melted, so that there will never be any of the wax left in the pan and the pan will not be left in contact with the heating unit to be continually reheated and caused to smoke and burn the pan.

Other objects and purposes of my invention will appear in the course of the following specification, in which I have shown my invention embodied in concrete form for purposes of illustration.

Referring to the drawings illustrating my invention, Figure 1 is a side elevation of my complete device; and Fig. 2 is a plan view of the same.

Referring to the drawings, 10 represents the electrically heated element for melting the sealing wax or the like. The particular construction whereby this element is heated forms no part of my invention. For purposes of illustration, I have shown a unit which may be of copper or other metal having a good thermal conductivity mounted upon a support 11. This support may be a fixed tubular support mounted upon the base 12 and bent in the form of a goose neck so that the unit will stand at an angle therewith. The electric heating unit for heating the element 10 is inside of the casing 13 and current is conducted to the heating unit 13' by means of wires 14 passing up inside of the tube 11. 15 is the heating pan for the sealing wax. This pan, in the form shown in the drawing, is provided with a spout at 16 for permitting the sealing wax to run out. At its rear end the pan is provided with two arms 17 by which the pan is pivoted to the support at 18. The pan is normally held out of contact with the unit in any suitable manner, as, for instance, by providing counterweights 19, as shown in the drawing, although, of course, any other means for producing this result may be employed without departing from the spirit of my invention.

In order that the heating pan may always be brought down into uniform contact with the heating unit, that is, in contact throughout the surface of the pan, I have provided a loose connection at the pivot 18. This I have done by making the elongated slot 20 for the pivot. This provides a certain amount of lost motion and will enable the pan to assume the desired position in contact with the heating unit.

In operation, the operator, desiring to melt the sealing wax, inserts the stick of wax 21 into the heating pan and forces the latter down into contact with the heating unit, as shown in dotted lines in Fig. 1. The heat is quickly communicated through the pan to the wax, which melts and runs out through the spout 16 on to the surface to be sealed. As soon as the desired amount of wax is run out the operator removes the stick of wax and allows the pan to assume its normal position. In this position there will be practically no wax left in the pan, and, since the pan is not in contact with the heating unit, there will be no burning of the pan or smoking due to the slight amount of residue left in the pan. It is obvious, of course, that my invention may be employed for other materials than sealing wax, such as solder and the like.

While I have described my invention as embodied in concrete form and as operating in a specific manner for purposes of illustration, it should be understood that I do not limit myself thereto, since various modifications thereof will suggest themselves to those skilled in the art without departing from the spirit of my invention, the scope of which is set forth in the annexed claims.

What I claim as new, and desire to secure by Letters Patent of the United States, is:—

1. A heater for sealing wax or the like comprising an electrically heated element and a pivoted heating pan biased to assume a horizontal position out of engagement with said element and arranged to be moved into an inclined position engaging the element.

2. In a heater for sealing wax or the like, a heating element, a pan mounted adjacent said heating element so that it may be pressed into good thermal relation therewith and automatic means for moving said pan away from said heating means upon removal of such pressure.

3. A device for melting sealing wax or the like comprising a mass of good heat conductivity, heating means for the same, a pan uncovered throughout its extent mounted adjacent to said mass so that it may be pressed against the same and means whereby the said pan is automatically moved away from said mass upon removal of the aforesaid pressure.

4. In a device for melting sealing wax or the like, a downwardly inclined mass of metal, an electrical heating unit adapted to heat the same and a pan mounted adjacent said mass of metal so that it may be pressed against the same, said pan having means at one end thereof for guiding the overflow of the melted material therefrom.

In witness whereof, I have hereunto set my hand this 6th day of May, 1911.

HENRY PRICE BALL.

Witnesses:
HELEN B. DAVERIN,
J. G. EDDY.

---

Copies of this patent may be obtained for five cents each, by addressing the "Commissioner of Patents, Washington, D. C."